United States Patent

Rosen

[15] 3,706,921

[45] Dec. 19, 1972

[54] REACTOR CONTROL INCLUDING INDIVIDUAL AND GROUP ROD MOTOR CONTROLS

[72] Inventor: Philip J. Rosen, Oak Park, Mich.

[73] Assignee: Diamond Power Specialty Corporation, Lancaster, Ohio

[22] Filed: Aug. 8, 1968

[21] Appl. No.: 751,216

[52] U.S. Cl. .................................318/564, 176/36
[51] Int. Cl. ............................G05b 9/02, G21c 7/08
[58] Field of Search......318/564, 565, 604, 681, 624; 176/36

[56] References Cited

UNITED STATES PATENTS

| 2,922,940 | 1/1960 | Mergler | 318/20.330 UX |
| 2,935,660 | 5/1960 | Patchell | 318/20.835 X |
| 3,138,750 | 6/1964 | Borger et al. | 318/20.070 |
| 3,309,588 | 3/1967 | Martin et al. | 318/20.075 |
| 3,377,924 | 4/1968 | Spencer et al. | 318/20.075 X |
| 3,391,317 | 7/1968 | Bell | 318/20.441 X |
| 3,440,504 | 4/1969 | Boskovich et al. | 318/20.070 |

Primary Examiner—T. E. Lynch
Attorney—Harness, Dickey & Pierce

[57] ABSTRACT

A control system for controlling the relative position of a plurality of control rods within a nuclear reactor, thus controlling the energy output of the nuclear reactor. The control system includes a single rod control subsystem for controlling the motion of the individual rods within the nuclear material and a group control subsystem for controlling a plurality of rods of a group.

The system includes a circuit for precluding any single rods or group of rods from being actuated in a direction opposite to that commanded to achieve synchronism of that particular rod. Thus, the rods moving from a first position to a second position, a reference position is established which is the average of the position of all the rods and the only rods which will move to position 2 will be those which deviate further from position 2 than the reference level. The system also includes a fault detection system.

8 Claims, 15 Drawing Figures

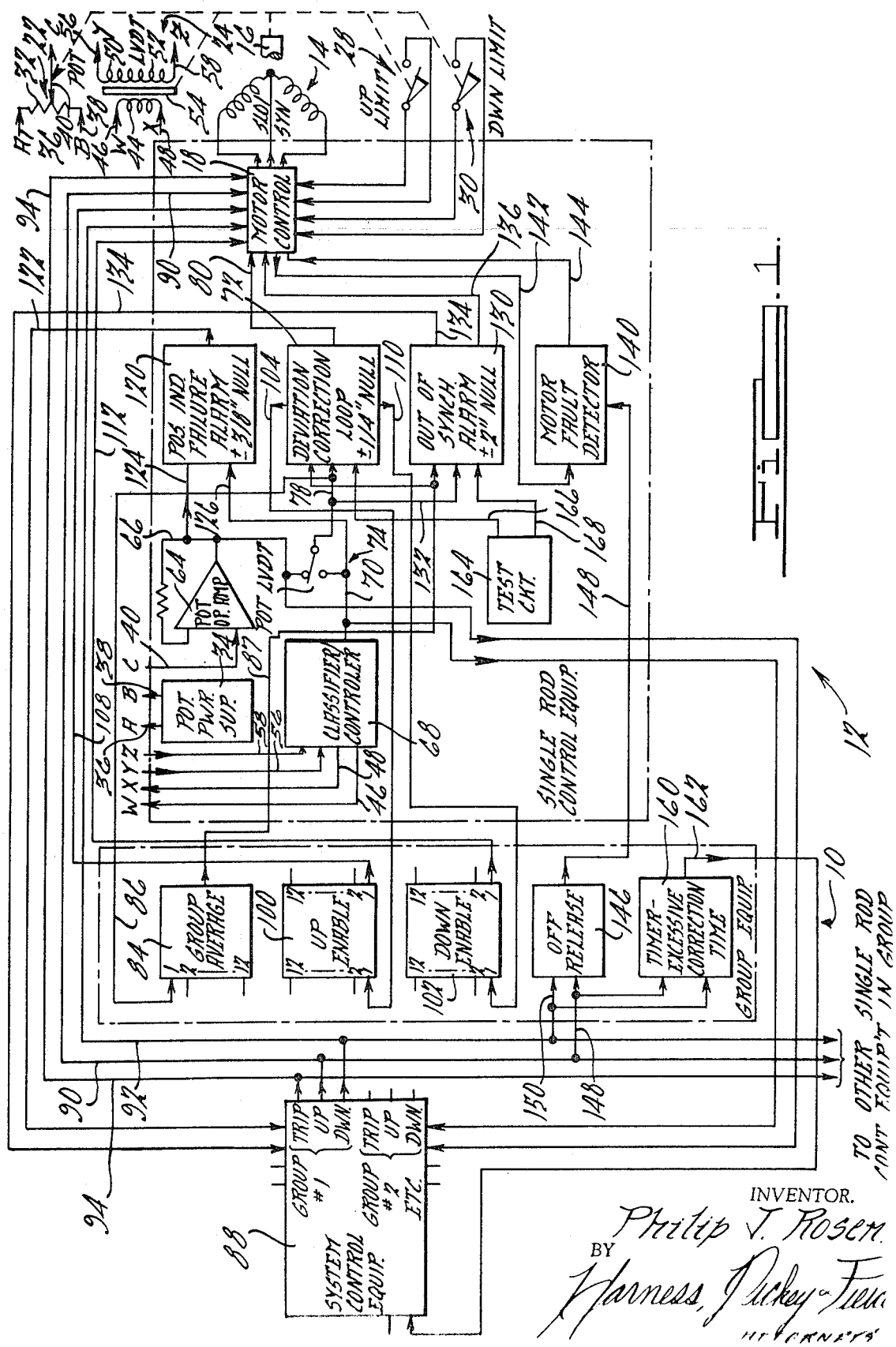

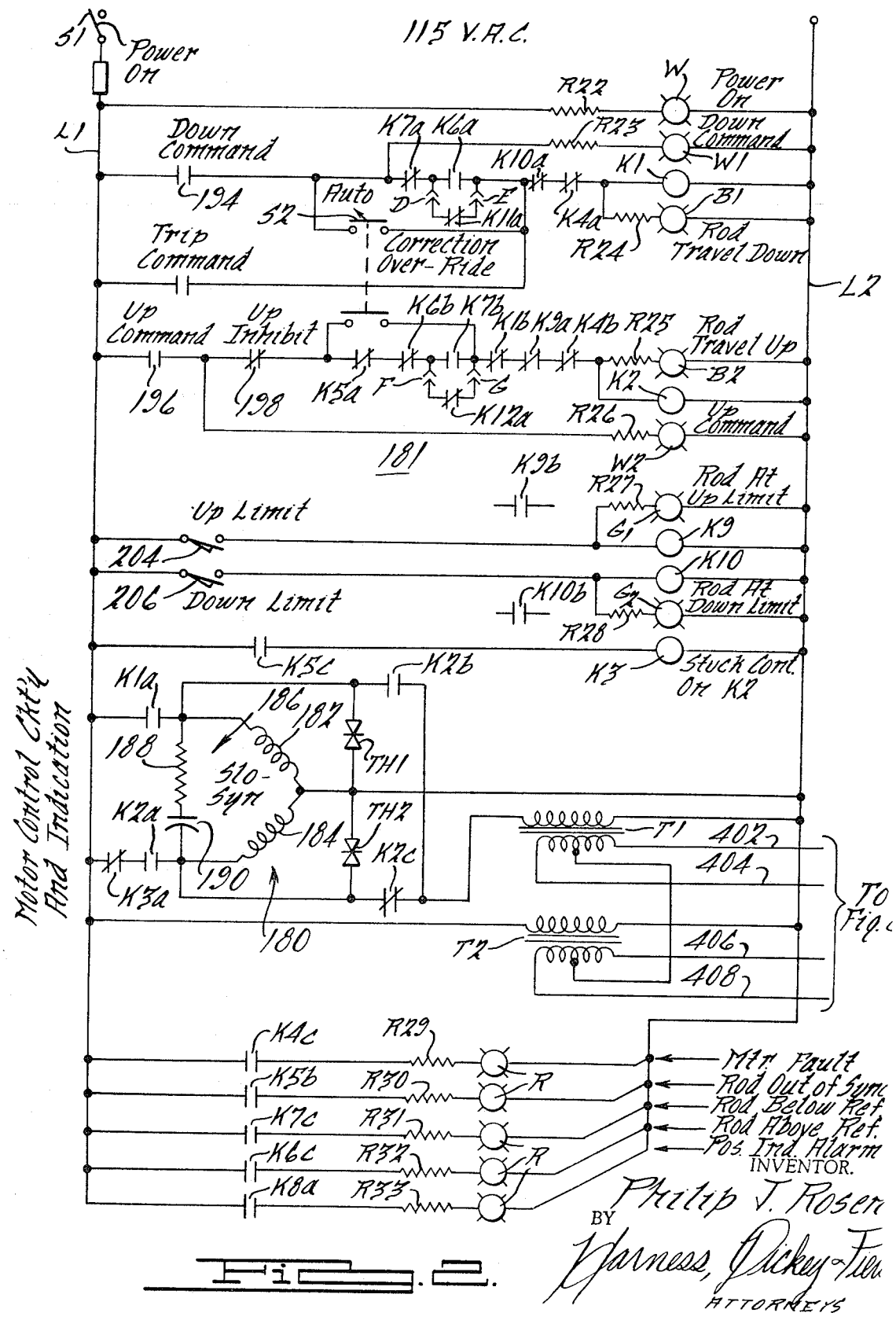

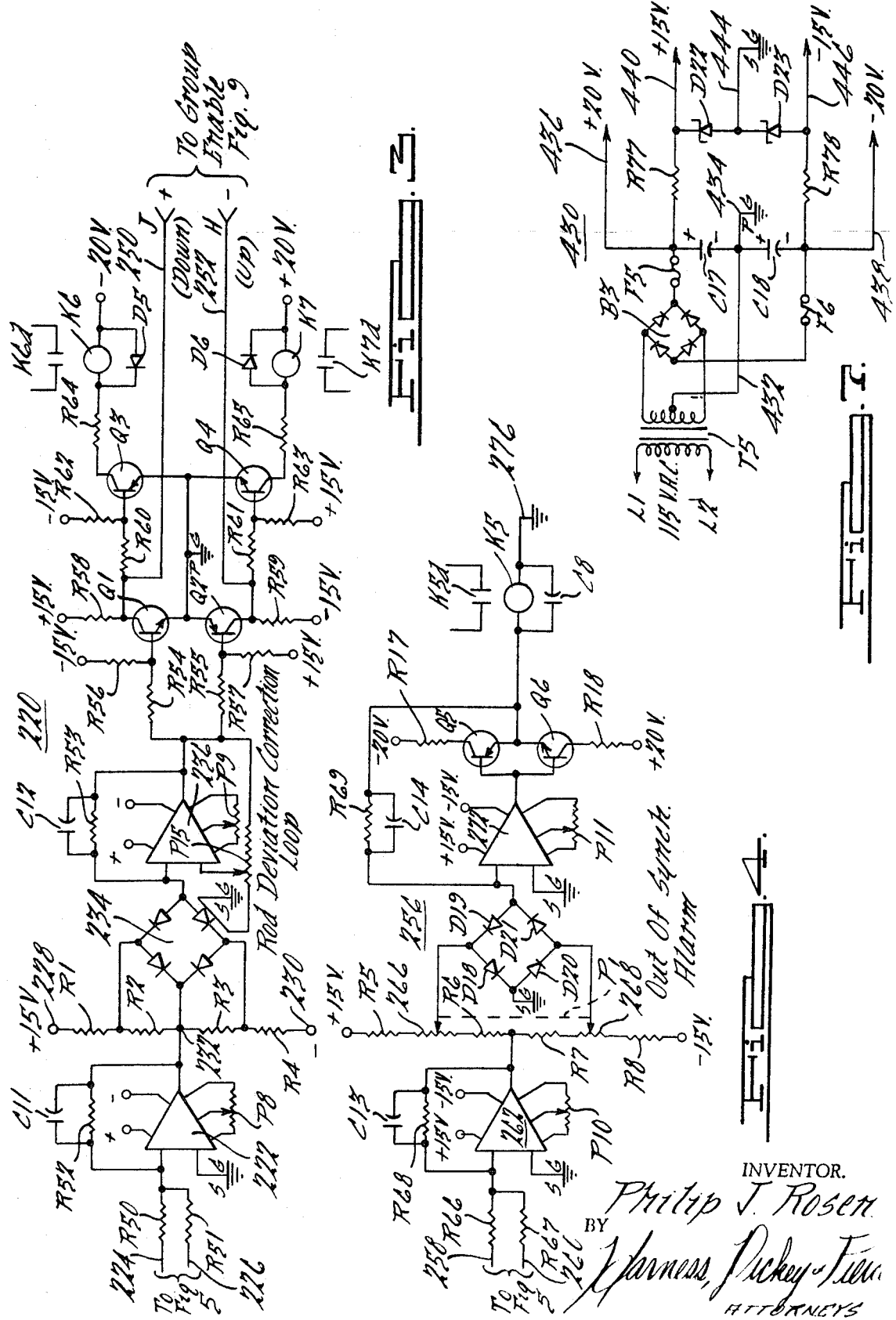

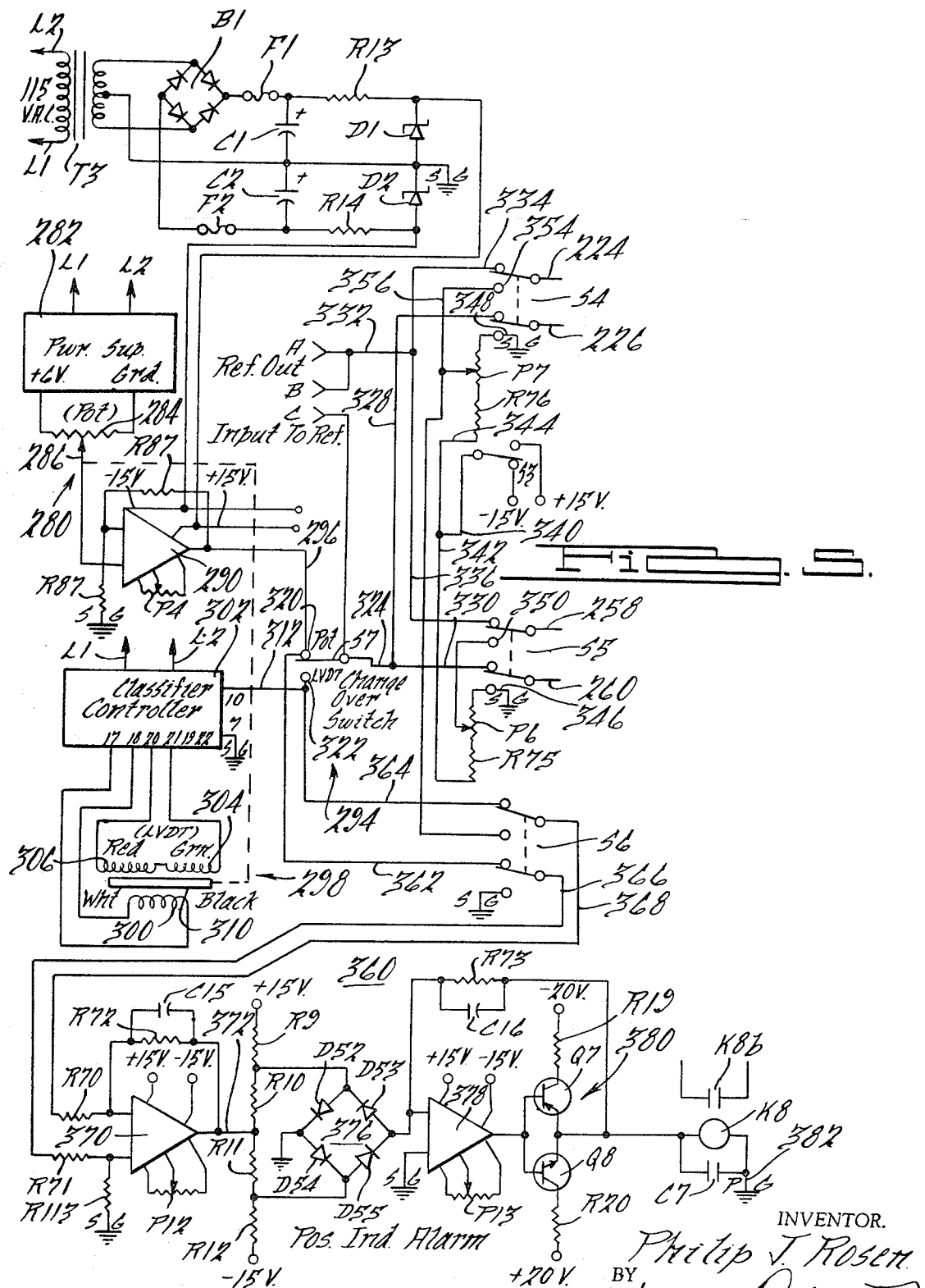

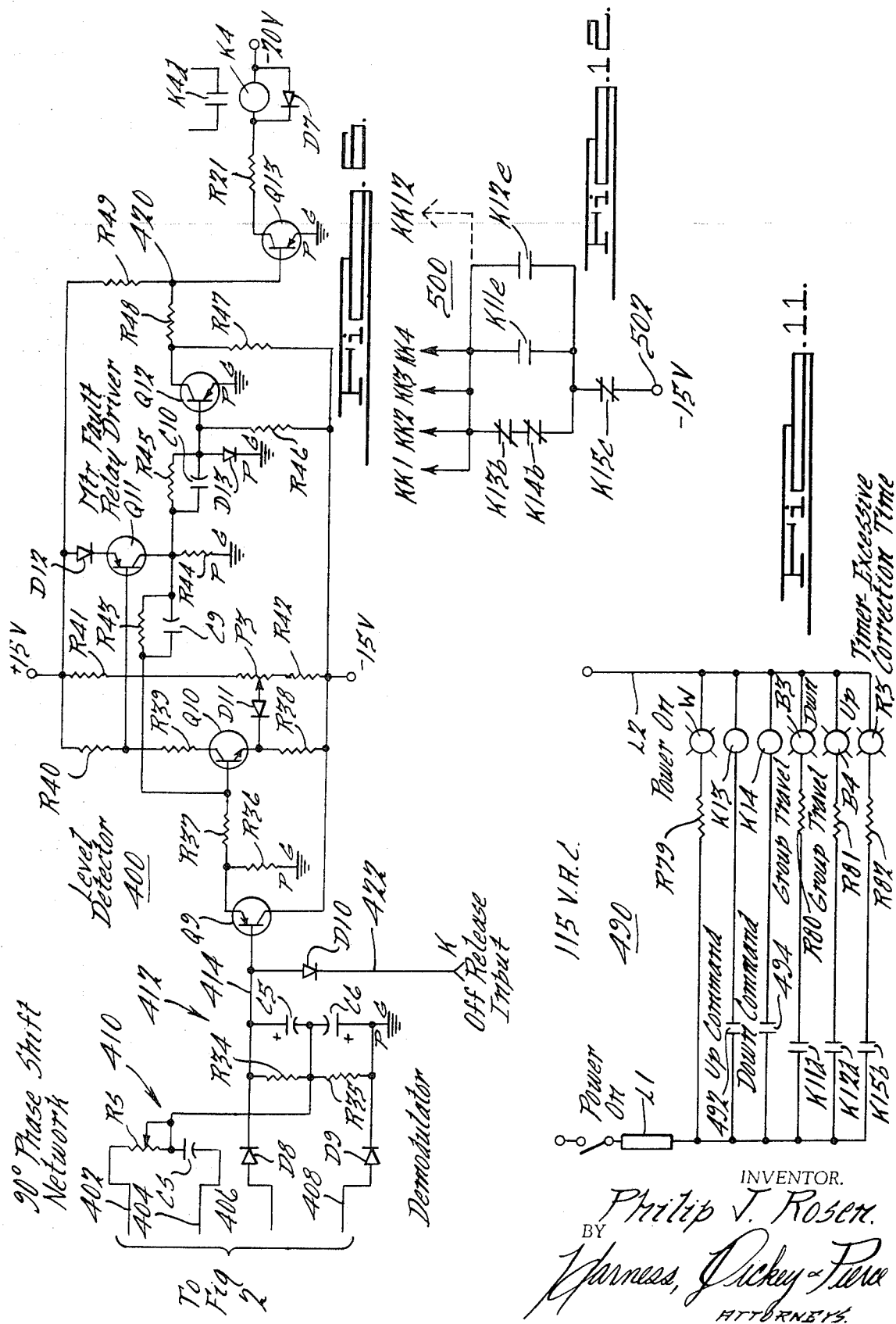

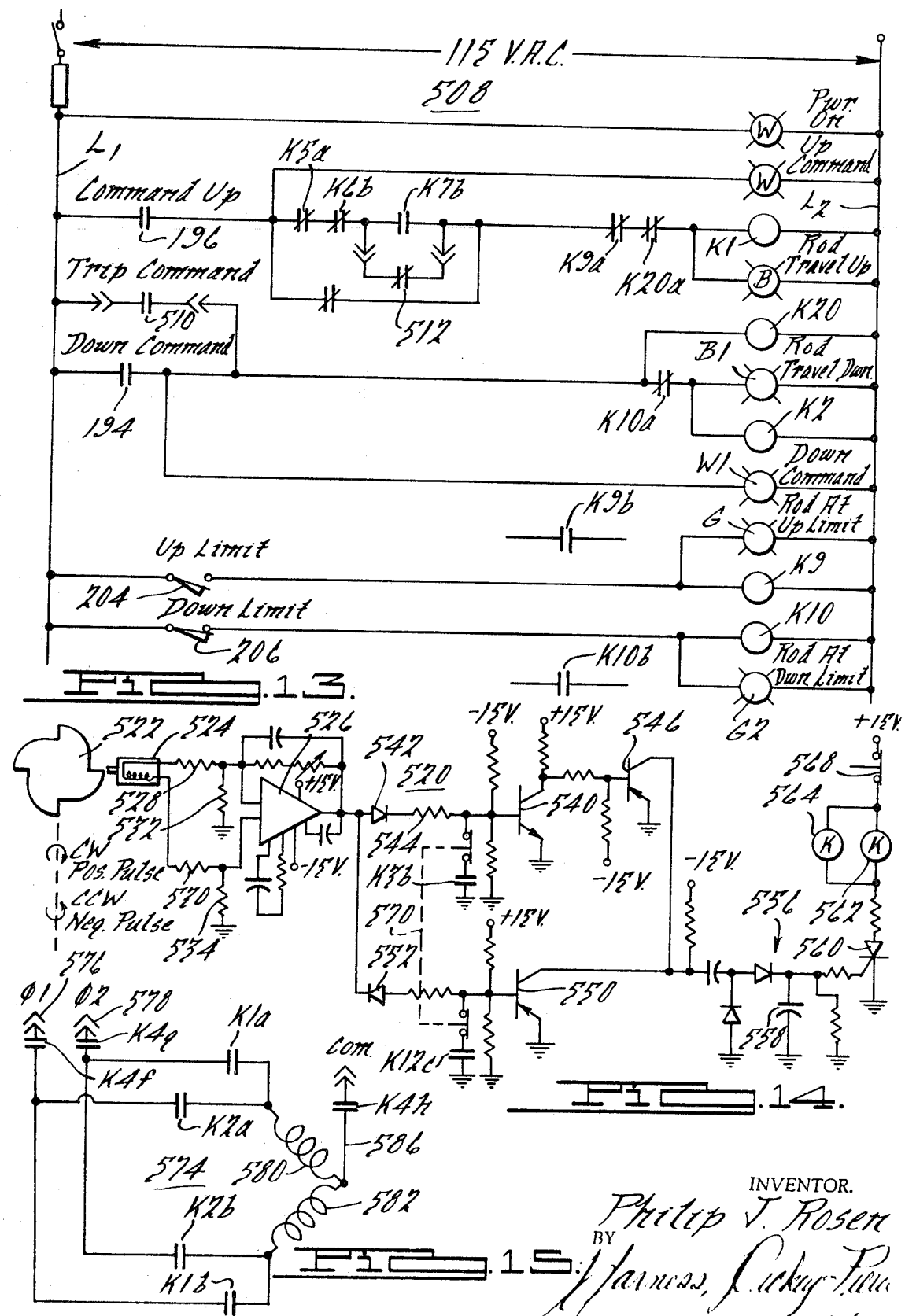

REACTOR CONTROL INCLUDING INDIVIDUAL AND GROUP ROD MOTOR CONTROLS

BACKGROUND AND SUMMARY OF THE INVENTION

This invention relates generally to a single motor control system and plural motor control system and more specifically to a control rod drive control system for controlling the position of individual rods within a group and for controlling the position of the group of rods relative to the reactor material.

In control rod drive systems utilized in controlling the energy output of a nuclear reactor, it has been the practice to synchronize the operation of each individual control rod with the operation of the other control rods within a group by means of certain drive motor characteristics, as for example the use of a synchronous motor or servo type system. However, in systems of this type, it is possible for the control rods to get out of synchronism due to dissimilar characteristics of the motor, as for example a variation in motor inertia, windage loss characteristics, mechanical friction of the relatively rotating parts or other motor mechanical and/or electrical characteristics. Certain other systems have been provided that include drives such as nutating actuators, magnetic jacks or variable reluctance motors. However, the power supplies necessary to control and energize these systems are extremely complex and expensive.

With the system of the present invention, the individual control rods may lose synchronism with respect to each other to a slight degree. However, the system automatically corrects the rod positions to bring all of the rods into synchronism through a system of position comparison with respect to a reference. With the system of the present invention, a large number of safety features have been incorporated to provide a substantially fail-safe type of operation. For example, the system of the present invention will not permit any single rod or group of rods to be actuated in a direction opposite to that commanded to achieve synchronism of the rod. Thus, if the major control system directs the control rod drives to increase the energy output from the reactor, the only direction in which any single rod or group of rods will be driven is in the up direction in spite of the fact that a single rod or group of rods may be out of synchronism and above the desired reference level.

In the particular embodiment disclosed, the single rod control subsystem includes a rod deviation correction circuit which senses the position of a single rod relative to a reference level and corrects the position of that rod to achieve coincidence between the rod position and the reference level. As stated above, in the system evolved, an individual rod is not driven in a direction opposite to that commanded. Thus, if the rods are commanded to move upwardly and an individual rod is above the reference level, the drive of that particular rod is inhibited until such time as the reference level moves to within a preselected distance of the position of the rod.

The single rod control subsystem further includes a circuit for generating an alarm when any rod or a plurality of individual rods deviates from the reference level by more than a preselected amount. Also, the single rod control subsystem includes a fault detection system for sensing a fault condition in the drive motor for the individual rods.

The group control subsystem is provided with a circuit for deriving a reference signal which is an average of the positions of each individual rod. This reference signal is utilized in the single rod control subsystem for comparison with the individual rod positions to generate a correction signal. An up and down inhibit circuit is included in the group control for driving all of the rods which are at the reference level in an open loop configuration to achieve a change in the selected energy level of the reactor. Further, a timer circuit is provided to generate an excessive correction time signal at such time when the time required for the rods to be driven in an open loop configuration exceeds a preselected amount after a command signal is received.

Certain other features have been incorporated into the system of the present invention, as for example a system for signaling the condition of the open loop mode of operation of the system and other operations. Also, the system of the present invention provides a means for inhibiting the drive motor fault circuit for precluding a fault condition indication when a command is not present.

Accordingly, it is one object of the present invention to provide an improved motor control system.

It is another object of the present invention to provide an improved motor control system which is particularly adaptable for use in connection with controlling the operation of nuclear reactor control rods.

It is a further object of the present invention to provide a control rod drive system having improved safety characteristics.

It is still another object of the present invention to provide an improved control rod drive system for use in a nuclear reactor, which system is incapable of driving any single rod or group of rods within the system, in order to achieve synchronism of the relative positions of the control rod, in a direction opposite to that commanded.

It is still a further object of the present invention to provide an improved reference signal generating system for use in connection with a control rod drive system, the reference signal generator providing a reference signal which is a function of the average position of the various control rods within the reactor.

It is still a further object of the present invention to provide an improved circuit for inhibiting or enabling the open loop operation of the control drive system in response to a preselected control rod configuration.

It is another object of the present invention to provide an improved position sensing system for use in sensing the relative position of a control rod in a nuclear reactor.

It is still a further object of the present invention to provide an improved correction circuit for use in connection with a reactor control rod drive system to achieve relative synchronism of the individual control rods relative to the others.

It is still another object of the present invention to provide an improved system for inhibiting the operation of a control rod drive system, particularly inhibiting the drive assembly for selected control rods, when the control rod is above or below the reference level and a down or up command is given, respectively.

It is a further object of the present invention to provide an improved system for sensing an extreme position deviation of a control rod or group of control rods relative to a reference level.

It is still a further object of the present invention to provide an improved "out of synchronism" alarm system which is responsive to the reference level and the position of the control rod with respect to the reference level.

It is another object of the present invention to provide an improved alarm system for generating an alarm signal when a first and second position transducer deviates in position signal, one relative to the other, by more than a preselected amount.

It is still a further object of the present invention to provide an improved motor fault detector for detecting a fault condition in a plural phase motor circuit.

It is still a further object of the present invention to provide an inhibit system for inhibiting the above described motor fault sensing circuit when the motor is not rotating, or a command is not given, or the system is not in the correction mode.

It is still a further object of the present invention to provide an improved excessive time system for generating an output signal at such time as the above described control rod drive system utilizes an excessive time to achieve the open loop mode of operation.

It is a further object of the present invention to provide a control rod drive system which is inexpensive to manufacture, reliable in operation and achieves a high degree of safety in use.

Further objects, features and advantages of this invention will become apparent from a consideration of the following description, the appended claims and the accompanying drawings in which;

FIG. 1 is a block diagram of a control rod drive system incorporating the features of the present invention;

FIG. 2 is a schematic diagram illustrating a portion of the details of a single rod control system incorporating the features of the present invention;

FIG. 3 is a schematic diagram of another portion of a single rod control system and particularly illustrating the rod deviation correction system;

FIG. 4 is a schematic diagram of another portion of the single rod control system of the present invention, and particularly illustrating the out-of-sync alarm circuit;

FIG. 5 is a circuit diagram illustrating still another portion of the single rod control system of the present invention and particularly illustrating the test, polarity changeover and position indicator alarm circuits;

FIG. 6 is a schematic diagram illustrating still a further portion of a single control rod drive system of the present invention and particularly illustrating the motor fault circuit;

FIG. 7 is a schematic diagram of a typical power supply circuit utilized in the system of the present invention;

FIG. 11 is a schematic diagram illustrating the particular details of the command circuit utilized in conjunction with the group control rod system;

FIG. 12 is a schematic diagram illustrating a motor fault inhibit circuit utilized to inhibit the single control rod motor fault system;

FIG. 13 is a schematic diagram illustrating an alternate single rod control system to that described in conjunction with FIG. 2 wherein the circuit has been somewhat simplified;

FIG. 14 is a schematic diagram of an alternate motor fault detection circuit; and FIG. 15 is a schematic diagram of a two phase motor as energized from a two phase source of electrical energy.

Figure 10:
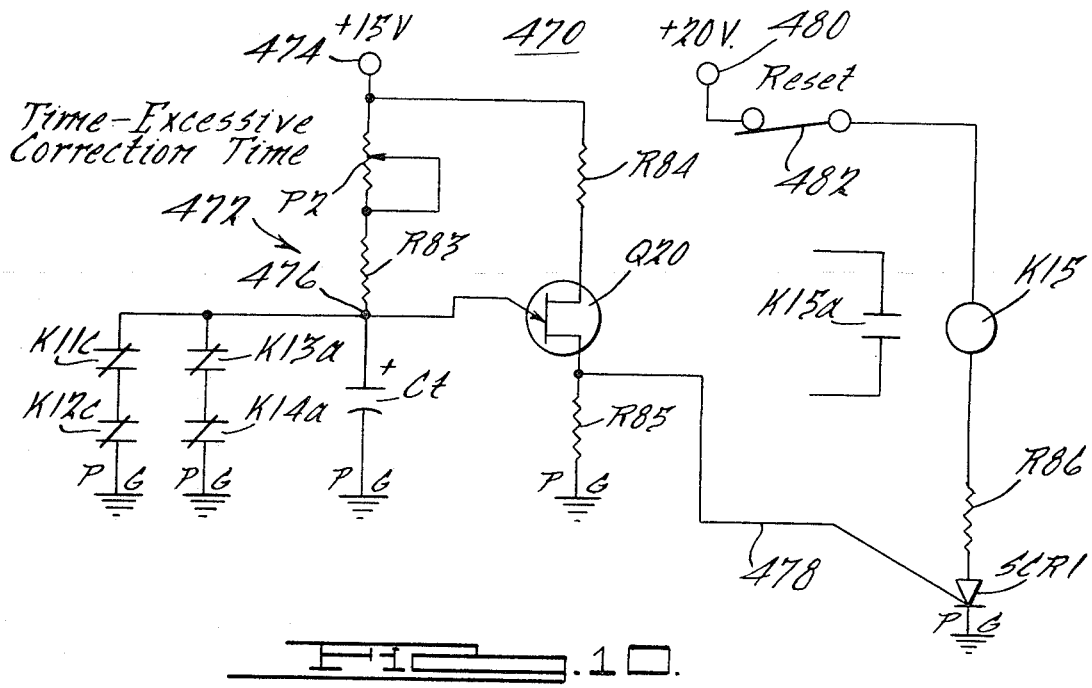
FIG. 10 is a schematic diagram illustrating the specific details of an excessive time correction circuit.

The control of reactors requires the measurement and adjustment of the critical reactor condition; that is, when the rate of production of neutrons equals the rate of consumption in the system. One method of controlling the reactor is by controlling the absorption of neutrons within the reactor, this absorption being accomplished by the placement of neutron absorbing rods, or control rods, in the reactor under exacting conditions. The control rods are arranged to increase reactivity, or increase neutron population, slowly and under absolute control. The system must also be capable of reducing reactivity (lowering the control rods) both rapidly and slowly.

In order to accomplish these control functions, the control rod drive system must provide an accurate indication of the rod positions at all times. Also, the control drive system must be capable of maintaining the control rods within a particular group at a relatively equal level to avoid hot spots within the reactor itself. Further, the reactor control drive must provide a relative degree of safety to preclude the possibility of the system failing and, through the failure, raising the control rods unintentionally thus causing an unintentional and uncontrolled increase in reactivity.

With the system of the present invention, control of the control rods in the up or down direction in response to up or down commands and also the relative positions of the control rods within a group, one relative to the other, may be very closely regulated. In the drive unit, any type of controllable motor drive may be utilized, thus obviating the necessity of a synchronous motor drive with the inherent reliance on the synchronous characteristics of the motor to maintain control rod synchronism. Further, the system of the present invention provides the necessary inherent safety features required in controlling control rods and further includes the desired alarm and fault detector circuits to insure the detection of a fault condition within the system.

Referring now to the drawings, and particularly to FIG. 1 thereof, there is illustrated a block diagram of the control rod drive system of the present invention and particularly illustrating the group control system 10 which provides a control for all of the control rods within a particular group, and a single rod control system 12 provided for each single control rod within the specific group. The single control rod system 12 is adapted to control the positioning of each of the single control rods relative to a reference level and also provides certain position sensing signals and alarm or fault detector signals. The group control systems generate an average reference signal which is derived from the individual control rods and also provides enabling signals to permit the rods to be operated in an open loop configuration.

Referring to the specific details of the circuit of FIG. 1, it is seen that a two phase motor 14 is adapted to drive a control rod 16 (representatively illustrated), the motor 14 being controlled as to direction and duration of energization by means of a motor control circuit 18. The relative position of the control rod 16 with respect to the full up or full down position is sensed by two position transducers, the first being illustrated as a potentiometer type transducer 22 and the second being illustrated as a linear variable differential transformer transducer 24. The plural transducers are provided in order to derive checking signals to insure that the transducer being utilized for position sensing is accurately sensing the position of the control rod 16.

The extreme up position of the control rod 16 is sensed by an up limit switch 28, the limit switch 28 being tripped by any suitable device which indicates the extreme up position of the control rod 16. The extreme down position of the control rod 16 is similarly sensed by means of a down limit switch 30 which is similarly actuated to indicate the extreme down position of the control rod 16.

The potentiometer 22 is of conventional design and includes a preselected resistance 32 which is supplied with electrical energy from a potentiometer power supply 34 through a pair of conductors 36, 38. The potentiometer includes a slide arm 40 which is adapted to be moved up or down or in rotation in response to the up or down movement of the control rod 16. Thus, a voltage representative of the position of the control rod 16 may be derived from the slide arm 40. The linear variable differential transformer system 24 is also of conventional design wherein a source of electrical energy is connected to a primary winding 44 by means of conductors 46, 48. The primary winding 44 induces a flux in oppositely wound secondary windings 50, 52 through a core 54. The position of the polarity of the voltage at output conductors 56, 58. With the armature 54 in the center position, the output voltage across terminals 56, 58 is zero.

The output of the potentiometer is fed to a potentiometer operational amplifier circuit 64 by means of the conductor 40 to provide an output signal on conductor 66 indicative of the position of the control rod 16. Similarly, the output of the linear variable differential transformer is fed to a classifier/controller circuit 68 which also provides an output signal on conductor 70 indicative of the position of control rod 16. Either of the signals may be fed to a deviation correction loop circuit 72 by means of a selector switch 74, the selector switch 74 enabling the operator to select either the potentiometer signal or the linear variable differential transformer signal for use in providing a correcting signal on a conductor 78 to correct the position of the control rod 16.

The deviation correction loop circuit 72 requires, in addition to the position signal on conductor 78, a reference signal for deriving a control signal for the motor control 18. It is the comparison between the actual position signal on conductor 78 and the reference signal which generates the correction signal and feeds the signal to the motor control circuit 18 by means of a conductor 80.

The reference signal for the system is generated by a group averaging circuit 84 which, as will be seen hereinafter, generates a signal which is an average of the position of all of the control rods within a particular group. The position of each control rod, as provided by the signal on conductor 78, is fed to the group averaging circuit by means of the conductor 86. It is to be noted that the group averaging circuit 84 receives an individual control rod input signal from each control rod within the group. This average signal is fed to the deviation correction loop circuit 72 by means of a conductor 87.

However, the motor control circuit 18 will not operate to energize the motor 14 in either the up or down direction until such time as an up or down command is received from the operator. This up or down command is fed to a system control circuit 88 which is adapted to control several groups, as for example group 1 and group 2 shown in the system control block 88. The up command from the system control circuit 88 is fed to the motor control circuit 18 by means of an up command conductor 90. Similarly, the down command is fed to the motor control circuit by means of a conductor 92. Also, the motor control circuit is provided with a trip signal by means of a conductor 94 to provide a reactor "scram" mode of operation wherein the control rods rapidly drop to the downmost position to deactivate or lower the energy output of the reactor to the extreme inactive state. The rods are normally dropped by gravity by releasing a clutch upon receipt of a "trip" command. The "trip" command is simultaneously sent to the motor control 18 on conductor 94 to rotate the motor 14 in the downward direction in the event of a clutch failure.

As stated above, when a group of rods are at the reference level and, in the case of an up command, all the remaining rods in the group are above the reference level, it is desired to operate the lowermost rods in an open loop configuration to bring the rods as a group up to the reference level and to the rods above the reference level and subsequently to move all of the rods in the group to the new energy level commanded for the reactor. The opposite situation is true in a down command wherein it is desired to move all of the rods at the reference level in a group downwardly in an open loop configuration when the remaining rods are lower than the reference level. It is to be remembered that the circuit of the present invention is devised so that no control rod will be moved in a direction opposite to that commanded. It is to be understood, however, that this premise is purely for illustrative purposes and the control rods could be operated otherwise, if desired, by modifying the system.

In order to achieve this operation, an up enable circuit 100 and a down enable circuit 102 has been provided for generating enabling signals for the motor control circuit 18. Accordingly, the up enable circuit 100 is energized in response to a deviation correction loop signal on output conductor 104 which indicates that the particular rod is at or above the reference level. This signal, along with the other signals from the other control rods in the particular group, are fed to the up enable circuit 100 and an output signal is generated on output conductor 108 at such time as all of the rods in the particular group are either at or above the reference level. This signal on conductor 108 is fed to the motor control circuit 18 and this signal is correlated with the signal on conductor 80 to provide an energizing signal for the motor 14 in the event that the signal on conductor 80 indicates that the rod is not above the reference level.

A similar condition exists with the down enable circuit 102 which is provided with a signal from the deviation correction loop circuit 72 by means of a conductor 110. As was the case with the up enable circuit 100, the down enable circuit 102 also receives signals from each of the single control rod circuits. If each of the control rods within a group is either at the reference level or below the reference level, an output signal is generated on conductor 112 which is fed to the motor control circuit 18. The signal on conductor 112 is correlated with the signal on conductor 80 to provide a down energizing signal for the motor 14 in the event that the rod is not below the reference level. It is to be understood that the up enable circuit and down enable circuit provide signals similar to those on conductors 108 and 112 for each of the single control rod motor control circuits to operate the motor control circuits in a manner similar to that described above.

The system of the present invention includes several alarms and a fault detector circuit for indicating malfunction conditions within the system. For example, a position indicator failure alarm circuit 120 is provided to generate an output signal on an output conductor 122 at such time as the position indicators are out of synchronism. Specifically, a potentiometer input signal is impressed on an input conductor 124 to the failure alarm circuit 120, as is a linear variable differential transformer position signal fed thereto by means of a conductor 126. The position indicator failure alarm circuit 122 compares the two signals on conductors 124 and 126 and generates the alarm signal on conductor 122 at such time as the position indicators indicate that the position of the control rod 16 deviates by more than a preselected amount such as three-eighths on an inch. It is to be understood that this latter deviation is selected purely for illustrative purposes and the system may be adjusted to provide any deviation, within limits.

Also, an out-of-synchronism alarm circuit 130 is provided which generates an output signal at such time as the individual control rod 16 deviates from the reference signal by more than a preselected amount, as for example two inches. The out-of-synchronism alarm circuit 130 receives an input signal from the group averaging circuit 84 and also receives a position input signal from the potentiometer or linear variable differential transformer, whichever is selected, this latter signal being fed to the circuit 130 by means of a conductor 132. The position signal and the reference signal are compared and the alarm circuit 130 generates an output signal on a conductor 134 and a second output conductor 136. The conductor 134 is interconnected with the system control equipment to provide an indication of the deviation and inhibit the operation of the up command portion thereof to preclude the upward travel of the motor. Conductor 136 provides a signal to the motor control circuit to signal that the system is out of synchronism and provide a visual indication thereof.

The signal on conductor 134, as fed to the system control equipment, open circuits the up command portion of the single rod control, thus disabling an up command relay which controls contacts in the motor energization circuit. Also, a motor fault detector circuit 140 generates a fault signal in response to the sensing of a fault condition in the motor circuit. The motor circuit conditions are sensed by means of a conductor 142 and the fault signal is fed back to the motor control circuit by means of a conductor 144. The motor fault circuit is disabled by means of an off release circuit 146 which generates the disabling signal on a conductor 148. The off release circuit is responsive to an up or down command signal on conductors 149, 150, respectively, to actuate the off release circuit during the period that the system is receiving an up or down command.

Finally, an excessive correction time circuit 160 is included to sense the time required for the system to achieve the desired mode of operation, particularly the open loop mode, and generates a fault alarm in the event the system requires an excessive amount of time to achieve this mode. This fault condition is fed back to the system control by means of a conductor 162. Also, a test circuit 164 is interconnected with the deviation correction loop 72 and the out-of-sync alarm circuit 130, the test circuit generating both a reference signal and a position signal on each of the conductors 166, 168. The reference and position signal generated on conductor 166 will provide a test deviation to the deviation correction loop, the test deviation exceeding the dead band selected for the correction circuit. A similar test condition is fed to the alarm circuit 130, the test deviation, in this case, being more than two inches.

Referring now to the specific circuit details of the system of the present invention, reference is made to FIGS. 2 to 12 of the drawings. FIG. 2 illustrates a motor control circuit 180 which is provided for each of the single rod controls and further illustrates the command circuitry 181 for controlling the up or down energization of the motor. The specific motor circuit 180 includes a two phase winding having a first winding 182 and a second winding 184 connected across a source of 115 volt alternating current energy at L1 and L2. The windings 182, 184 are connected in a two phase configuration with a phase shift network 186 interconnecting one end of the windings 182, 184. The network 186 provides a 90° phase shift for the winding which is not directly connected across the electrical source at L1, L2. The phase shifting circuit includes a resistor 188 and capacitor 190 as is common in the art.

Accordingly, when the winding 182 is directly provided with electrical energy, the winding 184 is supplied with electrical energy which is shifted 90° from that supplied to the winding 182. The energization of the windings 182 and 184 are controlled by means of a pair of normally open contacts K1a and K2a, respectively, which are in turn controlled by a down command and up command pair of normally open contacts 194, 196, respectively. The closure of the down and up command contacts 194, 196 are controlled by a central command network (not shown), which may sense the output of the reactor and generate commands to increase or decrease the reactor output automatically.

Assuming the down command contacts 194 are closed, the down command relay coil K1, connected in series therewith through normally closed contacts K7a, K11a, K10a and K4a and normally open contacts K6a, is energized to close contacts K1a in series with the coil 182. The closure of normally open contacts K1a also energizes the phase shift network 186 to provide 90° phase shifted energy to the winding 184. Thus the motor 180 will rotate in a first direction to cause the control rod 16 to be lowered, assuming other conditions (to be discussed) are proper. On the other hand, if an up command is given, thus closing up command contact 196, the relay coil K2 will be energized assuming that a plurality of intervening contacts 198, K5a, K6b, K7b, K12a, K1b, K9a, K4b are closed.

The energization of relay coil K2 closes normally open contacts K2a, K2b and opens normally closed contacts K2c. In this situation, the coil 184 is energized directly from the 115 volt ac source while the coil 182 is energized through the phase shift network 186, thus rotating the motor 180 in the opposite direction to raise the control rods. A pair of voltage control devices TH1 and TH2 are connected across windings 182, 184, respectively, to limit the transient voltages generated by the windings 182, 184. Also, normally closed contacts K3a are connected in series with the contacts K2a for a purpose to be hereinafter explained.

The energization of relay coil K1 opens the contacts K1b in series with the relay coil K2 to preclude a simultaneous up command signal being fed to the motor circuit 180 and to establish a priority of the down command relative to the up command. A plurality of indicator lights have been provided in the down command circuit to indicate the receipt of a down command and also to indicate the energization of the relay coil K1. Thus, a series circuit including resistor R23 and indicator light W1 is connected across the source of electrical energy at L1 and L2 so that the light W1 is illuminated at such time as down command contacts 194 are closed. A second indicator light B1 and resistor 24 are connected across the relay coil K1 to indicate the energization of the relay coil K1.

In the event an up command is received and contacts 196 are closed, the relay coil K2 is energized to close contacts K2a in the motor circuit 180 and also to close the contacts K2b. Also, the contacts K2c are opened, the closure of contacts K2b and opening of contacts K2c being for a purpose to be hereinafter explained. The closure of the up command contacts 196 energizes an up command indicator light W2 through a resistor R26 to provide an indication that an up command has been received. Also, a rod travel up indicator light B2 is energized through resistor R25 in the event electrical energy is fed to the up relay coil K2.

An up limit and down limit control and indication is supplied by an up limit switch 204 and a down limit switch 206, respectively, which are connected in series with the respective up limit and down limit coils K9 and K10. Accordingly, when the up limit for the control rod 16 is reached, the up limit switch 204 is closed to energize relay coil K9. The energization of relay coil K9 causes normally closed contacts K9a in the up command circuit to be open thereby disabling the up command coil K2. Also, the coil K9 closes normally closed contacts K9b to provide an external indication of the achievement of upper limit of rod travel at a remote point and an up limit indicator light G1 is energized through resistor R27.

The down limit condition is sensed by the down limit switch 206 connected in circuit with the down limit relay coil K10 so that the energization of the relay coil K10 opens normally closed contact K10a in the down command circuit to disable the down command relay coil K1. The energization of coil K10 also closes contacts K10b to provide a remote indication of the achievement of the down limit, and energizes the down limit indicator light G2 through resistor R28.

The lower portion of FIG. 2 is utilized to provide indications of various conditions within the system, as for example a motor fault, rod out of synchronism, rod below reference, rod above reference conditions and a position indicator alarm circuit. As will be explained hereinafter, a motor fault circuit closes normally open contacts K4c connected in series with one of the fault lights R through resistor R29. Also, the rod out of sync, rod below reference, rod above reference and position indicator alarm indicator circuits are energized by the closure of normally open contacts K5b, K7c, K6c and K8a, respectively, which in turn operate the indicator lights R through resistors R30, R31, R32 and R33, respectively. Further, if a rod is out of synchronism with the remainder of the group by more than a preselected amount, a K5c contact is closed to energize a stuck control relay K3 which in turn opens normally closed contacts K3a.

Figure 8:
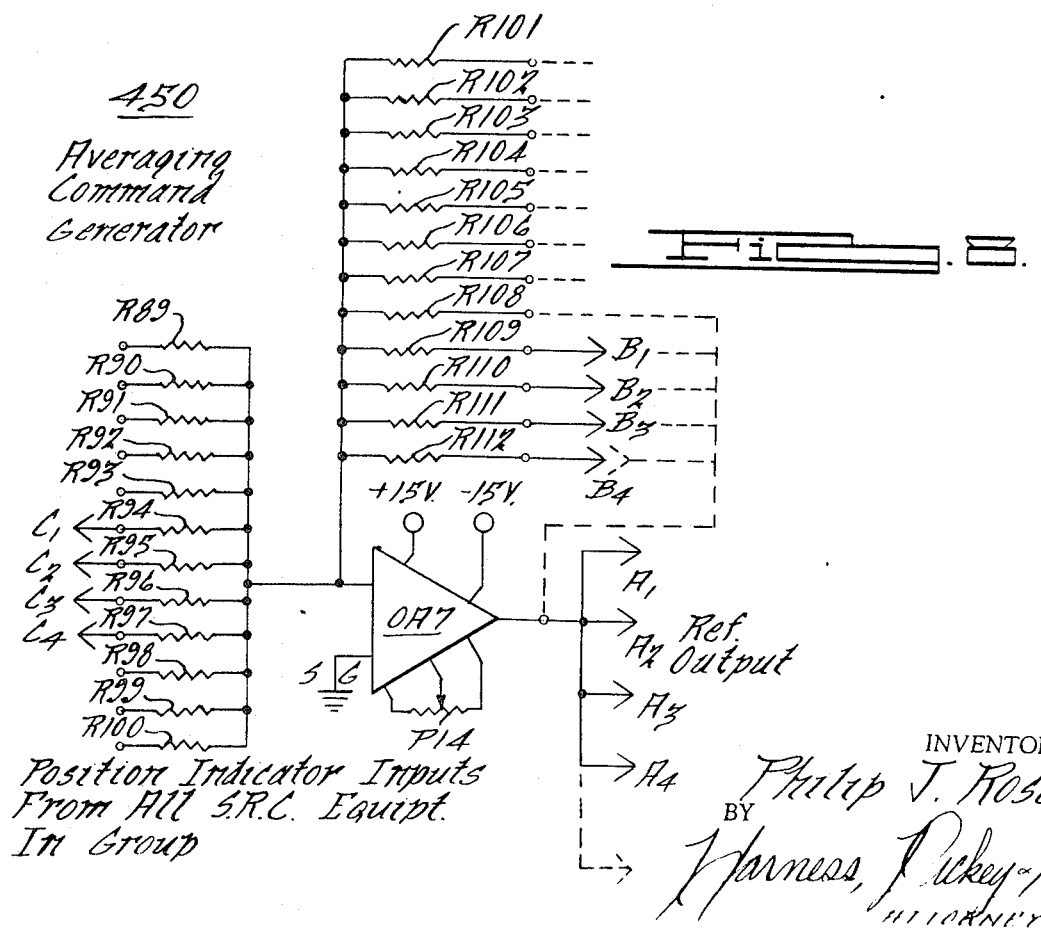
FIG. 8 is a schematic diagram illustrating the specific details of an averaging command generator circuit for use in generating a reference signal to be compared with a position signal of a single control rod.

Referring now to FIG. 3, there is illustrated the particular circuit details of a rod deviation correction loop circuit 220 which is adapted to be utilized in connection with sensing the difference between a reference signal and the individual position signal of the single rod control. The reference signal, the origin of which is to be more fully explained in conjunction with the explanation of FIG. 8, is impressed on an input circuit to a summation operational amplifier 222 by means of an input conductor 224 and resistor R50. A signal indicative of the position of the individual rod to be controlled is impressed on input conductor 226 and is fed to the operational amplifier 222 by means of a resistor R51. It is to be noted that the reference signal and position signal are of opposite polarity. As will be seen hereinafter, the position signal on conductor 226 may be derived either from a potentiometer transducer or a linear variable differential transformer transducer, both of which are adapted to sense the position of the rod.

The operational amplifier 222 includes a feedback resistor R52 which is of relatively high impedance to provide a high gain and stability of operation for the amplifier 222. A balance potentiometer P8 is also provided to permit the operator to balance the output operation of the amplifier. The output of amplifier 222 is fed to a voltage divider network, including resistors R1, R2, R3 and R4, the voltage divider network being connected between equal sources of positive and negative potential at terminals 228, 230, respectively. The output signal from the amplifier 222 varies the voltage at node 232 between a positive and negative value depending on the algebraic difference between the reference signal and the position signal and, with zero output signal from the operational amplifier 222, the voltage at node 232 will be zero.

Thus, the output signal from amplifier 222 represents the magnitude and direction of deviation of the rod position with respect to the reference level. The voltage at node 232 is fed through a rectifier circuit 234 to the input circuit of an operational amplifier 236, which includes a high resistance impedance R53, of the order of 2 megohms, to provide a relatively high gain from the amplifier 236. The amplifier 236 may be characterized as a bi-polar dead-band level comparator. The spread of the dead band to which the amplifier 236 will respond is, in the preferred embodiment, selected to be plus or minus a voltage equal to one-half inch of deviation of the single rod from the reference level.

The dead band of operational amplifier 236 is determined by the ratio of resistors R1, R2 and R3, R4 wherein R1, R2 determine the dead band for negative inputs to amplifier 236, and R3, R4 control the magnitude of the dead band for positive inputs to the amplifier 236. The balance of the amplifier is determined by potentiometer P9 and the gain of the amplifier is maintained at an extremely high level by the relatively large resistor R53. The output of the bridge 234 is fed into the upper input circuit of amplifier 236 and the lower input of amplifier 236 is provided with a positive feedback loop, including potentiometer P15. The positive feedback provides regeneration at the trigger point. P15 controls the hysteresis inherent in this type of circuit. The hysteresis tends to stabilize the electromechanical feedback loop.

The output of operational amplifier 236 is at a zero level whenever the input signal is within the dead band deviation, either in the positive or negative direction. However, if the operational amplifier receives a signal which is greater than the dead band level, the operational amplifier 236 will saturate and provide a positive or negative output signal, depending on the direction of deviation of the individual rod with respect to the reference level.

The output of operational amplifier 236 is fed to a pair of complementary transistors Q1, Q2 through resistors R54, R55. The base voltage for transistor Q1 is derived from a negative source of potential connected to the base electrode through the resistor R56. Similarly, the Q2 transistor is connected to a positive source of potential through resistor R57. The transistors Q1 and Q2 are normally nonconducting during the period when the output of operational amplifier 236 is at the zero level, thus indicating that the rod is at the reference level or within the dead band deviation from the reference level. The output of transistor Q1 is connected in controlling relation with a normally nonconducting transistor Q3 through a resistor R60, the base of transistor Q3 being connected to a negative source of potential through a resistor R62.

The transistor Q3 is adapted to control current flowing through a relay coil K6 which is connected at one end to the collector electrode of transistor Q3 through a resistor R64, and at the other end thereof to a negative source of potential. A diode D5 is connected across the coil K6 to absorb any inductive transient resulting from the energization or deenergization of the coil K6. The emitter electrodes of both Q1 and Q3 are connected to ground at PG such that the main current path of transistor Q1 is from a source of positive potential through resistor R58 and the collector-emitter circuit of transistor Q1 to ground. Similarly, the current flow through transistor Q3 is from the ground PG through the emitter-collector circuit of transistor Q3, the resistor R64 and the coil K6 to the negative potential.

Referring to the lower half of the output circuit of FIG. 3, it is seen that the transistor Q2 is similarly connected at its emitter-collector circuit to the ground potential at PG. The collector electrode is connected to a source of negative potential through the resistor R59 such that the current flow through the transistor Q2 is from the ground potential through the emitter-collector circuit of transistor Q2 and the resistor R59 to the negative potential. The base electrode of transistor Q2 is connected to a positive source of potential through a resistor R57. The normally nonconductive transistor Q2 is connected in controlling relation with a normally nonconducting transistor Q4 through a resistor R61 and the base electrode of transistor Q4 is connected to a positive source of potential through a resistor R63. The transistor Q4 is connected in current controlling relation with a relay coil K7, the coil K7 being connected at one end thereof to a source of positive potential and at the other end to the collector electrode of transistor Q4 through resistor R65. The emitter electrode of transistor Q4 is connected to ground potential at PG and a diode D6 is connected across the coil K7 to absorb any inductive transient generated by the coil K7.

Assuming that the output of operational amplifier 236 rises from a zero to a positive level signal, it is seen that the transistor Q1 is rendered conductive to thus turn on the transistor Q3, and the conductive state of transistor Q3 energizes the coil K6. On the other hand, a positive signal does not effect Q2 which is already nonconducting. It subsequently does not effect Q4 and K7. If a negative signal is received from the operational amplifier 236, the opposite effect is experienced; that is, Q1, Q4 and K7 are turned on and no effect is experienced on Q2, Q3 and K6. Relay coils K6 and K7 operate contacts K6d and K7d, respectively, to provide an external indication of the condition of relay coils K6, K7.

Accordingly, if an output signal is received from the operational amplifier 236 to indicate that the rod is above the reference level and outside of the dead band (a positive signal), the transistors Q1 and Q3 saturate to operate relay K6. On the other hand, if a negative signal is provided at the output terminal of operational amplifier 236 to indicate that the rod is below the reference level, the transistors Q2 and Q4 go to saturation to operate relay K7 and transistors Q1 and Q3 are rendered nonconductive to deenergize relay K6. The energization of relay K6 closes contacts K6a and opens contacts K6b in FIG. 2 to energize relay K1 if all of the remaining contacts in series circuit with the relay K1 are closed. However, as will be seen from a further description of FIG. 9, the system will operate to preclude any rod from moving in a direction opposite to a command given. Similarly the K6b and K7b contacts are operated in accordance with the energization or deenergization of the K6 and K7 relay coils to permit the energization of relay coil K2 in accordance with an up command signal through contacts 196.

Referring to the circuit of FIG. 2, and assuming that an up command is received and the up inhibit contacts are closed, any rod which is at the reference level will not be moved. Since the K7 relay is deenergized, the K7 contact will inhibit the operation of the K2 relay. This explanation further assumes that the K12 contact controlled by the group control is open during this period. If the rod is above the reference, the relay coil K6 is energized and the path to operate the relay coil K2 is inhibited by both contacts K6b and K7b. If the rod is below the reference, the K7 relay is energized to permit the K2 relay coil to be operated and cause the rod to move upwardly to a point such that the rod is within the dead band. Upon the rod reaching the dead band, the K7 relay is deenergized and the motion of the rod ceases.

Figure 9:
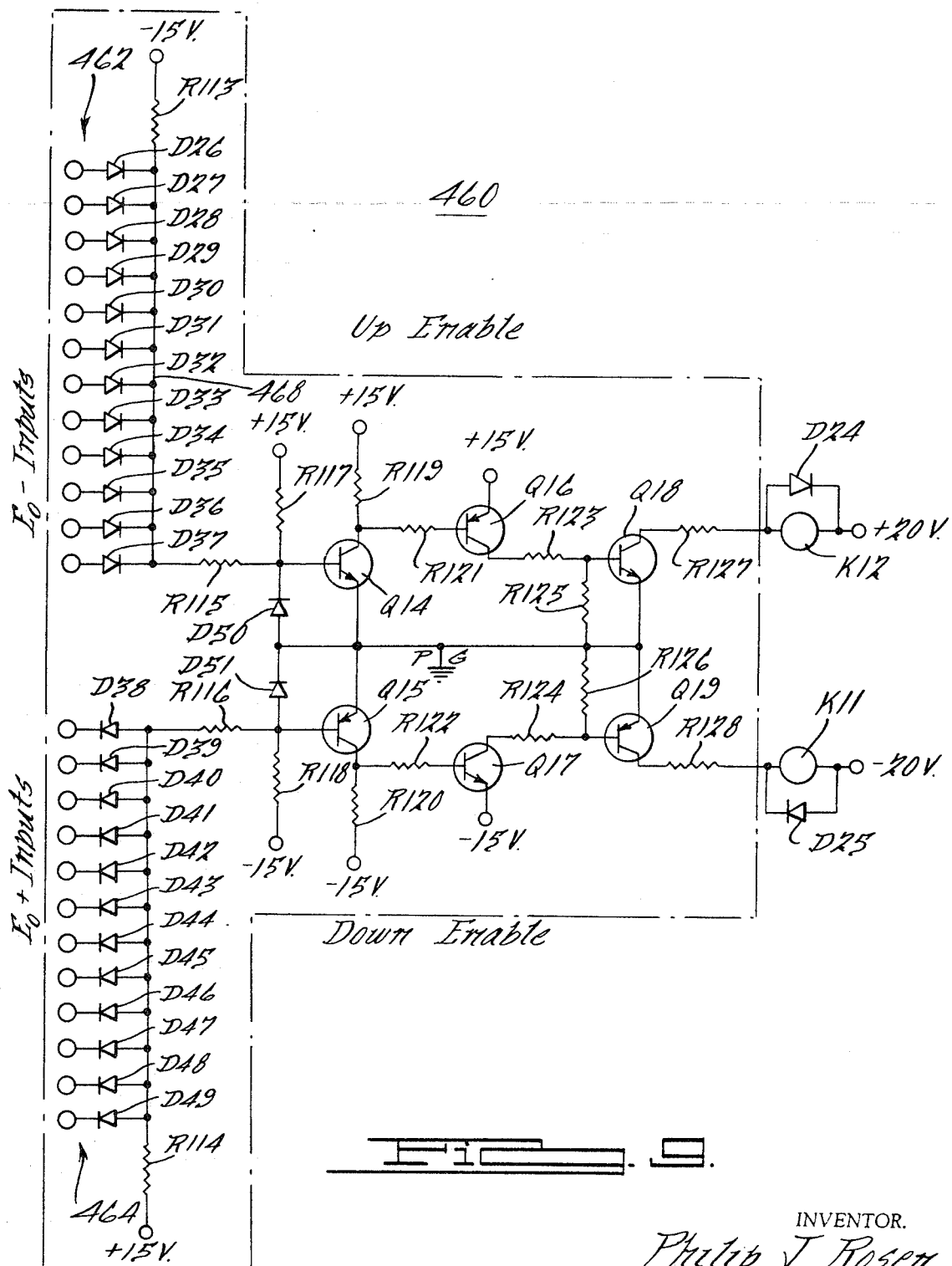
FIG. 9 is a schematic diagram illustrating the specific details of an up enable and down enable circuit for group control of the control rods.

Referring back to FIG. 3, there is provided a pair of output conductors 250, 252 which are utilized in generating control signals for a group enable circuit to be described in conjunction with FIG. 9. The output signals on conductors 250, 252 are generated in accordance with the conductive or nonconductive condition of transistors Q1 and Q2 as described above.

Referring now to FIG. 4 there is illustrated the particular circuit details of an out-of-synchronism alarm circuit 256 which is utilized in generating an alarm in the event that the individual rod deviates from the reference level by more than a preselected amount, which amount may be selectively variable. Alarm circuit 256 is provided with a reference signal on input conductor 258 and a single rod position signal on input conductor 260, which signals are derived from the circuit to be described in conjunction with the description of FIG. 5. The input signals on conductors 258, 260 are fed, through a summing circuit including resistors R66, R67, to an operational amplifier 262. The noninverting or direct input of amplifier 262 is grounded at SG and a feedback loop, including feedback resistor R68 and capacitor C13 are provided to stabilize the operation of the amplifier 262.

As was the case with the circuit of FIG. 3, the output of operational amplifier 262 is fed through a voltage divider network, including resistors R5, R6, R8 connected between a positive source of 15 volt potential and a negative source of 15 volt potential. The voltage divider network also includes a potentiometer P1 including an upper resistor and slider arm combination 266 and a lower resistor and slider arm combination 268. As was the case with FIG. 3, the relative value of resistors R5, R6 and potentiometer combination 266 relative to resistors R7, R8 and potentiometer 268 determine the dead band deviation for the circuit. The adjustability of potentiometer P1 permits the operator of the system to adjust the dead band for the circuit such that an alarm will be given when the single rod deviates from the reference level by more than a preselected amount. The voltages from potentiometer assemblies 266, 268 are fed through a network including diodes D18, D19, D20, D21 to a second operational amplifier 272, and particularly to the inverting input thereof. Again, the noninverting or direct input of operational amplifier 272 is grounded and a balancing potentiometer P11 is provided.

The output of amplifier 272 is fed to two complementary transistors Q5, Q6, the emitter-collector circuits of which are connected between ground and a positive source of 20 volt potential and a negative source of 20 volt potential through resistors R18 and R17, respectively. The emitter electrodes of transistors Q5, Q6 are connected in current controlling relation with an out-of-sync relay coil K5 which is connected at the other end to ground potential at 276. It is to be noted that the configuration of transistors Q5 and Q6 is such that any output signal greater than zero from operational amplifier 272 will cause one of the transistors Q5, Q6 to conduct.

Accordingly, the relay coil K5 will be energized when the single rod deviates from the reference level by more than the dead band amount whether the deviation be in the positive or negative direction. The operational amplifier 272 and transistor configuration Q5, Q6 is provided with a feedback loop including resistor R69 and capacitor C14 to stabilize the operation of the amplifier 272. The coil K5 operates contacts K5d to provide an external indication of the energization of relay K5.

The energization of relay K5 also causes the closure of contacts K5c in series with the stuck contact relay K3 (FIG. 2) and also opens the contacts K5a to disable the up command circuit controlling the up command relay K2. Thus, if a single rod deviates from the reference level by more than a preselected amount, the up command portion of the system is inhibited to preclude the further movement in the upward direction of the particular rod involved.

Referring now to FIG. 5, there is illustrated the specific circuit details of the position sensing transducers, particularly the potentiometer and linear variable differential transformer circuits, and a position indicator alarm circuit. This latter circuit is utilized to check the output signals of the potentiometer and linear variable differential transformer transducers and compare these output signals to insure that they are indicating the same position, within limits, one relative to the other.

Specifically, the system of FIG. 5 includes a potentiometer circuit 280 which is supplied with a source of electrical energy from a power supply circuit 282. The potentiometer includes a resistor element 284 and a slider arm 286, this slider arm being controlled as to its position by means of the position of the single rod. Accordingly, an output signal is derived on slider arm 286 which is indicative of the position of the rod, this signal being fed to an operational amplifier 290. The operational amplifier 290 is utilized to improve the impedance match between potentiometer circuit 280 and the utilizing circuits connected to output conductors 226 and 260 described in conjunction with FIGS. 3 and 4. The operational amplifier 290 includes a balancing potentiometer P4 and also a feedback circuit including resistor R87 to stabilize the operation of the amplifier 290. The output of amplifier 290 is fed to a changeover switch assembly circuit 294 by means of a conductor 296.

The switch assembly 294 also includes an input from a linear variable differential transformer circuit 298 which includes an energizing coil 300 supplied with electrical energy from a classifier-controller circuit 302. The energy flowing in winding 300 generates lines of flux through a circuit including a pair of differentially wound secondary windings 304, 306 and a movable armature 310. The armature movement, and thus position, is controlled by the position of the single control rod and, in its center position, generates a zero output voltage across the coils 304, 306. The movement of the armature 310 from the center position, either to the left or right, generates a positive or negative voltage to the classifier-controller circuit 302. This output voltage is fed to the changeover switch assembly 294 by means of a conductor 312.

The switch 294 includes an armature member S7 which is adapted to be selectively engageable with either a potentiometer terminal 320 or a linear variable differential transformer terminal 322 to provide an output signal on conductor 324 in accordance with the particular transducer which is selected. The signal on conductor 324 is fed to the switch S4, particularly conductor 226, by means of a conductor 328. Also, the output signal on conductor 324 is also fed to the switch S5, particularly output conductor 260 by means of a second conductor 330. These output signals on conductors 226 and 260 are fed to the circuits described in conjunction with FIGS. 3 and 4.

Also, the reference input signal from the reference generating circuit (to be described in conjunction with FIG. 8) is fed to an input conductor 332, this latter signal being fed to switches S4, S5, particularly conductors 224, 258, by means of conductors 334, 336, respectively. Thus the switch S4 is provided with a signal representative of the reference level and the position transducer, the same situation being true for switch S5.

In order to test the operation of the circuits of FIGS. 3 and 4, the switches S4 and S5 are provided with test signals which simulate the dead band, these test signals being adapted to be fed to the circuits of FIGS. 3 and 4 by means of transferring switches S4, S5 to their lowermost position. Thus, potentiometers P6 and P7 are supplied with a source of negative 15 volt potential or a positive 15 volt potential at switch S3 depending on the position of the armature of switch S3. This potential is fed through a conductor 340 to the potentiometer P6 by means of a conductor 342 and to the potentiometer P7 by means of a conductor 344. The other end of potentiometer P6 and P7 is connected to ground at 346, 348, respectively.

The potentiometer P6 includes a slider connected to a terminal 350 such that the armatures of switch S5 may be connected to terminal 350 and terminal 346 to provide an output signal across conductors 258, 260 which is greater than the magnitude of the dead band of the circuit of FIG. 4. Similarly, the potentiometer P7 includes a slider which is connected to the terminal 354 by means of a conductor 356 to permit the switch S4 to be connected between the voltage selected from potentiometer P7 and ground at 348. The potentiometer P7 is adjusted to provide an output signal across conductors 224 and 226 which is greater than the magnitude of the dead band of the system of FIG. 3.

A position indicator alarm circuit 360 provided to continuously sense the potentiometer output signal at terminal 320 by means of a conductor 362 and the linear variable differential transformer signal at terminal 322 by means of a conductor 364. The signals across conductors 362, 364 are fed to a switch S6 and subsequently to the alarm circuit 360 by means of conductors 366, 368, respectively. The voltage across conductors 366, 368 is fed to an operational amplifier 370 by means of resistors R70, R71, the output signal from the operational amplifier 370, on conductor 372, being indicative of the difference in position signals between the potentiometer and the linear variable differential transformer. The operational amplifier is provided with a balancing potentiometer P12 and a stabilizing feedback circuit including resistor R72 and capacitor C15. The output from operational amplifier 370 is fed to a voltage divider circuit connected between a source of positive 15 volt and negative 15 volt potential, the circuit including resistors R9, R10, R11 and R12.

The position indicator alarm circuit is similar in configuration to that described in conjunction with FIG. 4 and includes a bridge circuit 376 connected to the voltage divider circuit, an operational amplifier 378, a bidirectional output circuit 380 and an output indicator relay K8. The output signal from bridge circuit 376, including diodes D52, D53, D54 and D55, is directly related to the proportionality between resistors R9, R10 and R11, R12. It is these latter resistors that determine the dead band for the operational amplifier 378.

Accordingly, when the output signal on conductor 372 is at the zero level or within the dead band set by resistors R9, R10, R11 and R12, the operational amplifier 378 output will be at a zero level. However, if the output of amplifier 378 is driven either positive or negative, the amplifier circuit 380 will conduct to energize relay K8. The amplifier circuit 380 includes complementary transistors Q7 and Q8, the emitter-collector circuits of transistors Q7 and Q8 being connected between ground potential at 382 and a negative 20 volt potential through resistor R19 or a positive 20 volt potential through resistor R20, respectively. The energization of relay K8 closes the normally open contact K8a (FIG. 2) and also closes normally open contacts K8b, these latter contacts providing an external indication of the energization of relay K8.

In the system described, particularly the motor circuit described in conjunction with FIG. 2, it is possible for a motor winding to fail or the phase shift network to fail, thus permitting the motor to run in a direction opposite to that which is commanded. In order to detect this condition, a motor fault detector circuit 400, as shown in FIG. 6, has been provided which senses the operating conditions of the motor circuit of FIG. 2. Particularly, transformers T2 and T1 are connected to sense the energy supply source of the direct connected winding and the phase shifted winding, respectively, and provide output signals on output conductors 402, 404 for the phase shifted winding and 406, 408 for the direct connected winding. It is to be noted that contacts K2b and K2c control the sensing of the phase shifted winding by controlling which winding (182 or 184) is connected to transformer T1. If contact K2b is open and K2c is closed (relay coil K2 deenergized), winding 184 is connected to T2, and vice versa.

The line supply voltage is fed to the motor fault circuit 400 by means of the conductors 406, 408 and the diodes D8 and D9. The phase shifted energy is fed to a second phase shift circuit 410 by means of conductors 402, 404, the phase shift circuit 410 including resistors RS and capacitor CS to provide an additional phase shift of 90° for the phase shifted signal such that the output signal from phase shift circuit 410 is in phase with the signal generated across conductors 406, 408. These signals are fed to a half wave demodulator circuit including resistors R34, R35, capacitor C5, C6 and diodes D8, D9.

During the normal operation of the motor, the output of the demodulator circuit 412, at conductor 414, is a relatively large negative voltage, as for example a minus 8 volts. However, when a fault occurs, the output signal on conductor 414 is approximately zero volts and in the preferred embodiment does not exceed, in a negative direction, a minus 3 volts. The signal on conductor 414 is fed to a normally conducting transistor Q9 having a collector electrode connected to ground through a resistor R36. The output of transistor Q9 is coupled to a relatively nonconductive transistor Q10 through a resistor R37.

With the occurrence of a fault condition, the transistor Q9 conducts less to cause the transistor Q10 to conduct to a greater degree. The conductive condition of transistor Q10 is sensed by a transistor Q11 which increases its conduction upon the sensing of a fault condition. The output of transistor Q11 is coupled to a transistor Q12 by means of resistor R45 and capacitor C10, the transistor Q12 being rendered nonconductive upon the sensing of a fault condition. The nonconduction of transistor Q12 causes a node 420 to be driven to a negative voltage due to the fact that the combination of resistors R47 and R48 is less than the resistor R49. Contrariwise, the conduction of transistor Q12 raises the voltage at node 420 to a positive level because the left end of resistor R48 is at ground potential due to the conduction of transistor Q12.

The nonconduction of transistor Q12, and thus the negative voltage at node 420, causes the conduction of an output transistor Q13, the transistor Q13 being connected in current controlling relation with an output relay K4. The energization of relay coil K4 indicates a fault condition and this fault condition is fed to the circuit of FIG. 2, particularly to open the normally closed contacts K4a and K4b, to deenergize the command circuits. Also, the fault indicator contacts K4c are closed to energize the motor fault indicator light R. Due to the fact that there is a danger of the motor running in a random direction for a specific command, the contacts of relay K4 are included in both the up and down command circuits to disable both of these circuits.

A K4d set of contacts is closed to provide an external indication of the motor fault condition. An off-release input circuit, including diodes D10 and input conductor 422, is provided to enable or disable the motor fault circuit during the period that no command is present. Thus, when there is no command to the motor drive circuit, a negative 15 volts is applied to conductor 422 to disable transistor Q9 and render it fully conductive. The signals for conductors 422 will be described in conjunction with the description of FIG. 12.

Referring now to FIG. 7, there is illustrated a power supply circuit 430 which may be utilized in conjunction with the system of the present invention. The power supply circuit 430 includes an input transformer T5, the primary of which is fed from a 115 volt source of electrical energy at L1 and L2. The output of the transformer is fed through a bridge circuit B3 and a center tap conductor 432. The transformer secondary and bridge B3 are connected to a first and second capacitor C17, C18, the center point of which is grounded at 434. With the connections illustrated, the capacitors C17 and C18 are always charged from negative to positive from the lower plate to the upper plate.

Thus, there is provided a positive 20 volt potential at output conductor 436 and a negative 20 volt potential at output conductor 438 relative to ground 434. The voltage at conductor 436 is dropped across a resistor R77 to provide a positive 15 volt output voltage at output conductor 440. This voltage is regulated by means of a constant voltage device D22, in the form of a zener diode, which is grounded at 444. Similarly, a negative 15 volt potential is provided at output conductor 446 after being dropped through a resistor R78. This latter voltage is also regulated by means of a zener diode D23.

Referring now to FIG. 8, there is illustrated an averaging command generator circuit 450 forming a portion of the group control system. The circuit 450 is adapted to provide an output signal for each of the single rod control drives, this output signal being an average of all of the single rod position signals being fed thereto from a particular group.

Assuming that there are 12 single rods within a group, each of the position signals, either from the potentiometer or the linear variable differential transformer, are fed to a plurality of input circuits including input resistors R89, R90, R91, R92, R93, R94, R95, R96, R97, R98, R99, R100, all of the resistors R89 to R100 being of equal value.

The common junction of the resistors R89 to R100, is fed to an operational amplifier OA7 which includes a feedback loop having a plurality of equal parallel resistors, the number of which is equal to the number of input resistors, R89 to R100, which are being utilized. Thus, the operational amplifier provides a gain of 1/N with respect to any one input and a gain of 1 with respect to the average input, where N represents the number of rods in a group, or the number of input resistors R89 to R100. Therefore, the output from operational amplifier OA7 represents a signal which is indicative of the average position of all of the rods within a group. The output signal from operational amplifier OA7 is fed, by means of a plurality of output terminals A1, A2, A3, A4 . . . A12, to the circuits of FIGS. 3, 4 and 5.

Referring now to FIG. 9, there is illustrated an up enable and down enable circuit 460 which is adapted to deenergize a first and second relay coil K12 and K11 at such time as all of the rods in a group are either at the reference level or above the reference level in the case of coil K12, or all the rods are at the reference level or below the reference level in the case of coil K11. The particular relay coil K12 or K11, when deenergized, is capable of bypassing a set of contacts in series with the rod travel coil, K1 or K2.

In the situation when all of the rods are at the reference level or below the reference level, relay coil K11 is deenergized, thus closing the contacts K11a in series circuit with the down command contacts 194 (FIG. 2) and in shunt circuit relation with contacts K6a. Thus, when the particular single rod is at the reference level, the contacts K11a will shunt the contacts K6a to drive the single rod in an open loop mode. It is to be noted that this situation occurs when all the rods are at or below the reference level and the particular rod being considered is at the reference level. If the particular rod being considered is below the reference level, relay contact K7a will be opened due to the energization of relay coil K7.

Referring now to the particular details of the system, a plurality of E zero negative (—EO) input terminals 462 are provided, each of the terminals 462 being connected to a respective single rod deviation correction loop as described in conjunction with FIG. 3. Particularly, the input terminal 462 is interconnected with conductor 252 (FIG. 3). A plurality of positive E zero (+EO) input terminals 464 are provided for interconnection with each of the rod deviation correction loops for the single control rod and particularly to the conductor 250 of FIG. 3. When any rod is at or above the reference level, the input signal to terminal 462 will be at a relatively high level in the negative sense, as for example a minus 15 volts. On the other hand, if any rod is at or below the reference level, the input to the respective terminal 464 will be a relatively high positive level or a plus 15 volts. Otherwise, the input to the particular terminal will be approximately zero volts.

Referring particularly to the up enable portion of the circuit, it is seen that the input terminals 462 are coupled to a common conductor 468 through a plurality of individual parallel connected diodes D26 to D37. The conductor 468 is connected to a negative source of dc potential through a resistor R113 and to a positive source of dc potential through resistors R115 and R117. The input signals from terminals 462 are coupled to a normally conducting transistor Q14 having a collector-emitter circuit from a positive 15 volt potential, through resistor R119 to ground at PG. The conduction of transistor Q14 maintains the conduction of a second transistor Q16 which is coupled thereto by means of a resistor R121. An output transistor Q18 is connected in current controlling relation with the output relay coil K12 through a resistor R127, the emitter-collector circuit of transistor Q18 being connected in series with the coil K12 and ground at PG. The conduction of transistor Q16 maintains the conduction of transistor Q18.

The conductive condition of transistors Q14, Q16 and Q18 is dependent on one or more of the input terminals 462 being at substantially a zero volt potential. However, if all of the input terminals 462 are at a negative 15 volt potential, thus indicating that all of the single rods are either at the reference level or above the reference level, the base electrode of transistor Q14 will be supplied with a voltage to turn off transistor Q14. With transistor Q14 in the nonconductive state, transistors Q16 and Q18 will be turned off to deenergize relay coil K12. The deenergization of relay coil K12 indicates that all of the rods are either at the reference level or above the reference level.

Referring now to the lower portion of the circuit of FIG. 9, particularly the down enable portion, it is seen that the circuit is substantially identical with the exception of a reversal of polarity. Particularly, input terminals 464 are provided with a positive 15 volt potential when a particular rod or plurality of rods is at or above the reference level. The input terminals 464 are coupled to the base electrode of a normally conductive transistor Q15 by means of diodes D38 to D49. The signals on input terminals 464 control the conductive or nonconductive state of normally conducting transistors Q15, Q17 and Q19, the latter of which is connected in series circuit with relay coil K11.

Accordingly, if all of the individual rods are at or below the reference level, all of the input terminals 464 are provided with a plus 15 volt potential from the rod deviation correction loops of the single rod control circuits, particularly from the conductor 250 (FIG. 3). With all of the input terminals 464 at a positive 15 volt potential, the transistors Q15, Q17 and Q19 are rendered nonconductive to deenergize the relay coil K11.

Referring now to FIG. 2 and assuming that all of the rods are at or above the reference level and relay K12 is deenergized, the up command coil K2 will be energized if an up command is received. It is to be noted that prior to the closure of contacts K12a, relay contact K7b impeded the energization of relay coil K2. In the case where the single rod is above the reference level, the energization of relay coil K2 will still be impeded due to the fact that the contacts K6b will be open because of the energization of relay coil K6. Relay coil K6 will remain energized until such time as the reference level, which is increasing as the remaining rods within the group are moving upwardly, reaches the level of the single rod which is above the reference level. At this time contact K6b will close due to the deenergization of relay coil K6, and the path to relay coil K2 will be closed to permit the particular rod to move upwardly with the group in a synchronous and open loop mode.

In the case of a down command, the same situation exists with the exception that the object is now to bring all of the rods above the reference level down to the reference level. In this situation, relay coil K6 is energized, as is relay coil K11. The energizing path to the coil K1 is thus completed from the down command contacts, through closed contacts K7a, closed contacts K6a to the relay coil K1. When the particular rod reaches the reference level, contacts K6a will be opened to deenergize the relay coil K1. When all of the rods are at or below the reference level, the down enable relay K11 will deenergize to complete the circuit to energize relay coil K1 for all the rods except those below the reference level. In the case of a rod which is below the reference level, the circuit to relay coil K1 is broken by the energization of relay coil K7 and thus opening of contacts K7a.

When the rods in the group have moved down to the point where the lowest rod is within the reference level (plus or minus the dead band), relay coil K7 for this rod will deenergize thereby allowing relay coil K1 to energize and move the particular single rod synchronously with the remainder of the group. Thus, all of the rods at the reference level will be moved as a group at the reference level and any remaining rod that is not at the reference level and is to be moved in the direction of the command will be moved individually in a closed loop configuration. All other rods which would have to be moved in a direction opposite to the command in order to achieve the reference level are inhibited against any movement until such time as the reference level moves into coincidence (plus or minus the dead band) with the position of the particular rod.

Referring now to FIG. 10, there is illustrated a timing circuit 470 for timing the duration of the period it takes to achieve the condition when all of the rods are either at or above the reference level when an up command is received, or when all of the rods are at or below the reference level when a down command is received. Specifically, the tiker circuit 470 comprises a timing network 472 which includes an adjustable potentiometer P2, a fixed resistance R83 and a capacitor CT. These elements are connected in series circuit between a positive 15 volt potential at terminal 474 and ground potential at PG. The output of the timing circuit, particularly node 476, is connected in controlling relation with a voltage responsive device, illustrated as a unijunction transistor Q20, the base 1-base 2 circuit of which is connected between the positive 15 volt potential at 474 and ground potential at PG through resistors R84, R85. Thus, when the charge on capacitor CT reaches the breakover voltage for the unijunction transistor Q20, the transistor Q20 will commence conduction to provide an output signal on conductor 478.

The signal on conductor 478 is utilized to control the conduction of a controlled rectifier device SCR1 which is connected at one end to a source of positive potential at terminal 480 through a reset switch 482, an output relay coil K15 and a resistor R86, and the other end of the controlled rectifier SCR1 is connected to ground potential at PG. Thus, the conduction of unijunction transistor Q20 provides a gate signal for the control rectifier SCR1 to energize the relay coil K15. The relay coil K15 will remain energized until such time as the reset switch 482 is opened. The energization of relay coil K15 closes normally open contacts K15a to provide an external indication to the operator that the system has required an excessive amount of correction time.

The operation of the timing circuit, particularly the charging of capacitor CT is inhibited by a plurality of normally closed contacts K11c, K12c, K13a and K14a which are connected in parallel with the capacitor Ct. As discussed in connection with the description of FIG. 9, contacts K11c, K12c are controlled by relay coils K11, K12 which are normally energized until such time as the rods reach the reference level or are below the reference level in the case of relay coil K11 and are at the reference level or above the reference level in the case of the relay coil K12. Thus, if these latter conditions are not met, one of coils K11, K12 will be energized to open the one or the other of the contacts K11c, K12a. The contacts K13a, K14a are controlled by a circuit to be described in conjunction with the description of FIG. 11. However, the contacts K13a or K14a are opened at such time as the system is receiving either an up command or a down command. Thus, in the situation where the system has not achieved the conditions of the rods being at the reference level or below the reference level in the case of K11c or the rods being at the reference level or above the reference level in the case of contacts K12c, and a command is being received, the timing cycle will be initiated. This timing cycle is terminated or inhibited when no command is being received or the relay coils K11, K12 are deenergized.

Thus, a circuit has been provided for determining the correction time of the system and, in the particular embodiment illustrated, this time is selected to be 5 seconds. If the correction is not accomplished with the preselected time period, the K15 relay will be energized to provide an output signal to the system control equipment. The manual reset resets the circuit if the time extends beyond the said interval. However, if the time is within the preselected interval, the circuit is automatically reset.

Referring now to FIG. 11, there is illustrated a control and indicator circuit 490 which provides an output signal in response to the receipt of an up command or a down command and also provides an indication when the system is in the up group travel mode, the down group travel mode or the fact that the system has required such a correction time. Specifically, the circuit is energized from a source of 115 volt alternating current energy across lines L1, L2, the energization of which is indicated by a power-on indicator light W.

The circuit 490 further includes up command and down command pairs of normally open contacts 492, 494 which are connected in controlling relation with relay coils K13 and K14 connected across the lines L1, L2. Thus, when an up command or a down command is received, the coils K13, K14 will be energized. At such time as the system is in the group travel, or open loop mode of operation, one of two sets of contacts K11d or K12d are closed to energize a group travel down or group travel up indicator lights B3, B4 to provide an indication that the system is in the group travel mode. Further, the energization of the excessive correction time relay coil K15 closes a pair of normally open contacts K15b to energize an indicator light R3 through a resistor R82.

FIG. 12 illustrates an off release inhibit circuit 500 which provides a plurality of output signals on output conductors KK1, KK2, KK3, KK4 . . . KK12 to the particular motor fault circuits described in conjunction with the description of FIG. 6, particularly to the off release input conductor 422. As stated above, a negative 15 volt potential impressed on conductor 422 will inhibit the operation of the motor fault detector circuit during preselected operations of the system. For example, it is desired that the motor fault circuit be inhibited when no command is present to the system, because when no command is present the motor is not operating and would thus indicate a fault condition. Accordingly, the output conductors KK1, KK2, KK3, KK4 . . . KK12 are connected to a negative source of 15 volt potential at input terminal 502 through a normally closed contact K15c which is connected in series with normally closed contacts K13b, K14b or in series with a normally open contact K11e or a second normally open contact K12e.

Thus, whenever a command is received, either of the contacts K13b or K14b will be opened to remove the inhibit from the motor fault circuit. Also, if the system is in an excessive correction time operation and the excessive time relay K15 has been energized, the normally closed contact K15c will be opened to remove the inhibit from the motor fault circuit. Further, the inhibit is applied whenever relay K11 or relay K12 has been energized to close either normally open contacts K11e or normally open contacts K12e. Accordingly, through the circuit of FIG. 12, the operation of the motor fault circuit 400 is controlled in accordance with preselected operating conditions of the system, particularly, when a command is present, the system has utilized excessive time to correct, or the system being in the open loop mode of operation.

Referring now to FIG. 13 there is illustrated a modified circuit 508 of the command control system of FIG. 2, the automatic deviation correction feature being eliminated from the down travel command circuit. In the circuit of FIG. 12, the trip command signal is generated by a trip command pair of normally open contacts 510 which simulates a down command signal to the down command relay coil K2. The energization of the relay coil K2 also energizes a relay coil K20 which has a pair of normally closed contacts K20a in series circuit with the up command contacts 196. Thus, when the trip command is received, the relay coil K20 will inhibit the operation of the up command circuit.

The down limit switch 206, as was the case with FIG. 2, energizes a down limit relay coil K10 which includes a pair of contacts K10a in series with the down command contacts 194. Thus, when the down limit position is reached by an individual rod, the down limit switch 206 will be closed to energize coil K10. The energization of the coil K10 opens the normally closed contacts K10a to disable the circuit for the down command coil K2. It is to be noted that the opening of contacts K10a does not deenergize the relay coil K20 and the relay coil will be energized when a trip command is received. Thus, the inhibiting of the up command circuit will continue after the down limit has been reached.

A pair of contacts 512 have been provided in shunt circuit with the contacts K7b in the up command circuit. The normally closed contacts 512 generally serve the same function as the contacts K11a described in conjunction with FIG. 2, the contacts 512 being operated (opened) in response to any desired condition. For example, the contacts 512 may be opened or closed in response to the same conditions which opened or closed the contacts K11a and for the same purpose described in conjunction with the description of FIG. 2.

FIG. 14 illustrates a modified motor fault circuit 520 which may be substituted for the motor fault circuit illustrated in FIG. 6. Specifically, the direction of rotation of the motor is sensed by means of a toothed cam 522, the direction of rotation of which is directly related to the direction of rotation of the drive motor rotor. The cam 522 is utilized in conjunction with a coil 524 to produce either positive or negative output pulses, depending on the direction of rotation of the motor. In the system illustrated in FIG. 13, a clockwise rotation of the cam 522 will produce a train of positive pulses and counterclockwise direction of rotation will produce a train of negative pulses. These pulses are fed to the input circuits of an operational amplifier 526 by means of a pair of resistors 528, 530, the resistors 528, 530 being connected to ground through resistors 532 and 534, respectively. The operational amplifier will produce output pulses, the polarity of the particular pulse generated by the cam 522 being determined by the polarity of the input pulses.

Positive output pulses from the operational amplifier 526 are fed to a transistor 540 through a polarizing diode 542 and a resistor 544. The base electrode of transistor 540 is clamped to ground by the command relay K3 through the normally open contacts K3b, this condition occurring if the direction of rotation of the motor is proper. The clamping of base electrode of transistor 540 to ground causes an output transistor 546 to be nonconductive.

The output pulses from operational amplifier 526 are also fed to a second transistor 550 through a diode 552. The base electrode of the transistor 550 is similarly connected to ground through a second pair of normally open contacts K12c. If the output pulses are positive, these pulses will be blocked from transistor 550 by means of the reversed diode 552. On the other hand if the direction is not correct, transistor 550 will be supplied with negative pulses to render the transistor 550 conductive. These output pulses from transistor 550 are fed to an integrating circuit 556 including a capacitor 558, this capacitor being connected in controlling relation with an output controlled rectifier 560 connected in series with output relay coils 562, 564. The capacitor 558 is selected to be of such a value that the second or third pulses from either transistor 546 or transistor 550 will trigger the SCR 560.

The relay coil circuits includes a reset switch 568 which, when opened, will reset the circuit by turning off controlled rectifier 560. Also, a test circuit is provided in a test switch 570 connected in each of the base circuits of the transistors 540, 550 and in series with normally open contacts K3b and K12c.

Referring now to FIG. 15 there is illustrated a two phase motor circuit which may be used in lieu of the motor circuit 574 described in conjunction with the description of FIG. 2. The motor 574 is fed from a two phase source of potential at input jacks 576, 578, this two phase energy being fed to windings 580, 582. The signals on the input conductors from plugs 576, 578 are controlled by normally open contacts K4f, K4g and the common conductor 586 is controlled by contact K4h, these contacts K4f, K4g and K4h all being controlled in response to the operation of the motor fault detection circuit.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A system for positioning a plurality of drive mechanisms to a preselected reference position comprising a reference signal generating means for generating a reference signal which is an average of the positions of the drive mechanisms, single drive signal means for generating a position signal for each drive mechanism, and output signal means associated with each drive mechanism response to both said reference signal and at least one position signal for providing an output signal in response to a deviation of said position signal and said reference signal, said output signal means comprising deviation detection means for sensing the deviation of said position signal from said reference signal, and output control means for controlling the drive mechanisms in response to a preselected deviation of said position signal from said reference signal, said deviation detection means including a detection input circuit and a detection output circuit, said detection output circuit including impedance means connected across a source of potential and a node point and two output terminals for developing a deviation detection signal for controlling the drive mechanism in response thereto, the voltage across said node point and one of said output terminals varying as a function of said deviation, said impedance means being connected to said output control means through a rectifying circuit which includes a full wave bridge circuit having one point thereof connected to said node, and a second point connected to one of said output terminals, said bridge providing a control signal which has a characteristic which varies in accordance with the deviation to control the output circuit.

2. A system for positioning a plurality of drive mechanisms to a preselected reference position comprising a reference signal generating means for generating a reference signal which is an average of the positions of the drive mechanisms, single drive signal means for generating a position signal for each drive mechanism, and output signal means associated with each drive mechanism responsive to both said reference signal and at least one position signal for providing an output signal in response to a deviation of said position signal and said reference signal, said output signal means comprising deviation detection means for sensing the deviation of said position signal from said reference signal, and output control means for controlling the drive mechanisms in response to a preselected deviation of said position signal from said reference signal, said deviation detection means including a detection input circuit and a detection output circuit, said detection output circuit including impedance means connected across a source of potential and a node point and two output terminals for developing a deviation detection signal for controlling the drive mechanism in response thereto, said detection input circuit including a summing circuit connected to provide a deviation signal which is the difference between the position signal and the reference signal, said summing circuit connected to the impedance means through an operational amplifier.

3. A system for positioning a plurality of drive mechanisms to a preselected reference position comprising a reference signal generating means for generating a reference signal which is an average of the positions of the drive mechanisms, single drive signal means for generating a position signal for each drive mechanism, and output signal means associated with each drive mechanism responsive to both said reference signal and at least one position signal for providing an output signal in response to a deviation of said position signal and said reference signal, said output signal means comprising deviation detection means for sensing the deviation of said position signal from said reference signal, and output control means for controlling the drive mechanisms in response to a preselected deviation of said position signal from said reference signal, said output control means including first and second switch means, said first switch means being operated when said deviation is a first polarity and said second switch means being operated when said deviation is of a second polarity, said switch means including controllable semiconductor devices and output relays, said relays being energized in response to the operation of said semiconductor devices, said relays including contacts associated therewith, said contacts being connected in controlling relation with the drive mechanisms, the drive mechanisms including reversible motor means and command means for energizing the motor in one direction or the other in response to the command means, said output control means further including first and second command relays adapted to control the direction of energization of the motor in response to the command means, said relay contacts being connected in circuit with the command means, said relay contacts enabling or disabling the command means in response to the magnitude and direction of deviation.

4. In a system for positioning a plurality of reversible motor drive mechanisms to a preselected position, the system including reference signal generating means for generating a reference signal which is indicative of the drive mechanisms being at a reference position, single drive signal means for generating a position signal for each drive mechanism, output signal means associated with each drive mechanism responsive to both said reference signal and at least one position signal adapted to energize selected ones of the drive mechanisms in response to a deviation of said position signal and said reference signal and a command network adapted to control the energization and direction of rotation of the motors, the invention comprising deviation sensing means associated with each drive mechanism for generating deviation signals which are a function of a direction of deviation of the drive mechanism from the preselected position and group enable circuit means connected to each deviation sensing means having a first state and second state for controlling the direction of rotation of the motors in response to the direction of deviation from the reference, said enable circuit means in response to the state of said enable circuit means, said enable circuit means being in said first state in response to all of the drive mechanisms being at the reference position or deviating therefrom in a first direction and being in the second state in response to all of the drive mechanisms being at the reference position or deviating therefrom in a second direction, said group enable circuit means including a first and second plurality of input circuits connected in an "and" gate configuration, said first input circuits generating a signal of a first magnitude when all of said deviation sensing means indicate that the drive mechanisms are at or deviate in said first direction from the reference position and a signal of a second magnitude when any of the drive mechanisms deviate in a second direction opposite to said first direction, said input circuits including a plurality of first and second parallel connected unidirectional conducting devices, said first devices being connected to a source of electrical energy so that said devices are nonconductive when said first magnitude signal is present and conductive when said second magnitude signal is present.

5. The invention of claim 4 wherein said second input circuits are responsive to generate third and fourth magnitude signals when all of said deviation sensing means indicate that the drive mechanisms are at or deviate from the reference position in said second direction, or deviate from said reference position in said first direction respectively.

6. The invention of claim 5 wherein said input circuits include a plurality of first and second parallel connected undirectional conducting devices, said first devices being connected to a source of electrical energy so that said devices are nonconductive when said first magnitude signal is present and conductive when said second magnitude signal is present, and said second device being connected to a source of electrical energy so that said devices are nonconductive when said third magnitude signal is present and conductive when said fourth magnitude signal is present.

7. The invention of claim 6 wherein the command network includes a first command generator and a second command generator for each drive mechanism, the first command generator being enabled in response to either the output signal means or said group enable circuit.

8. The invention of claim 7 wherein the output signal energizes the drive mechanism in a closed loop configuration, and the group enable circuit means energizes the drive mechanism in an open loop configuration.

* * * * *